Nov. 11, 1941.　　　P. E. PEARSON　　　2,262,697
CAN CLEANING MACHINE
Filed Jan. 29, 1940　　　6 Sheets-Sheet 1

Inventor
Paul E. Pearson
By Mason & Porter
Attorneys

Nov. 11, 1941.　　　　P. E. PEARSON　　　　2,262,697
CAN CLEANING MACHINE
Filed Jan. 29, 1940　　　　6 Sheets-Sheet 2
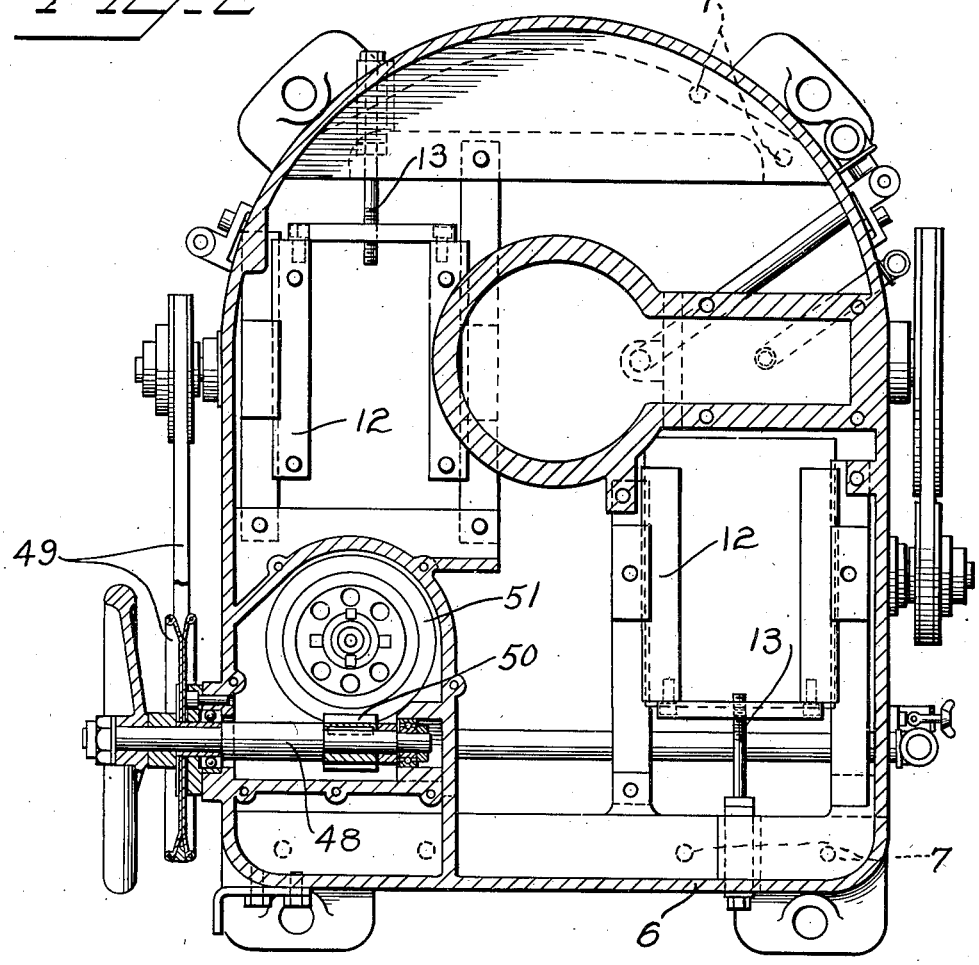
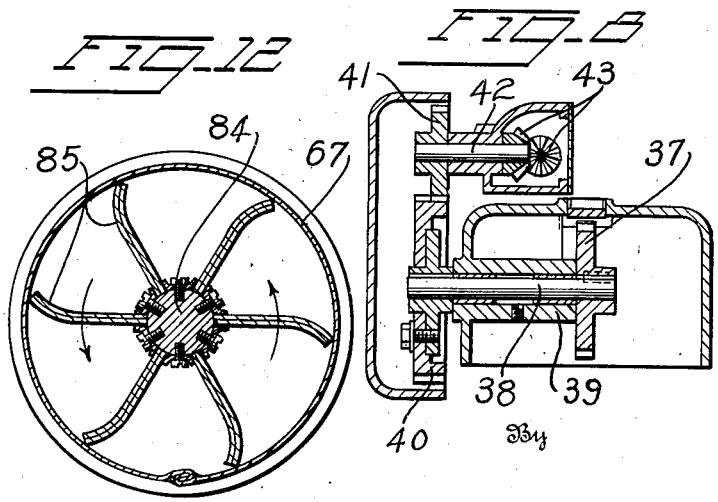
Inventor
Paul E. Pearson
By
Mason & Porter
Attorneys Nov. 11, 1941.  P. E. PEARSON  2,262,697
CAN CLEANING MACHINE
Filed Jan. 29, 1940  6 Sheets-Sheet 3

Inventor
Paul E. Pearson
By Mason & Porter
Attorneys

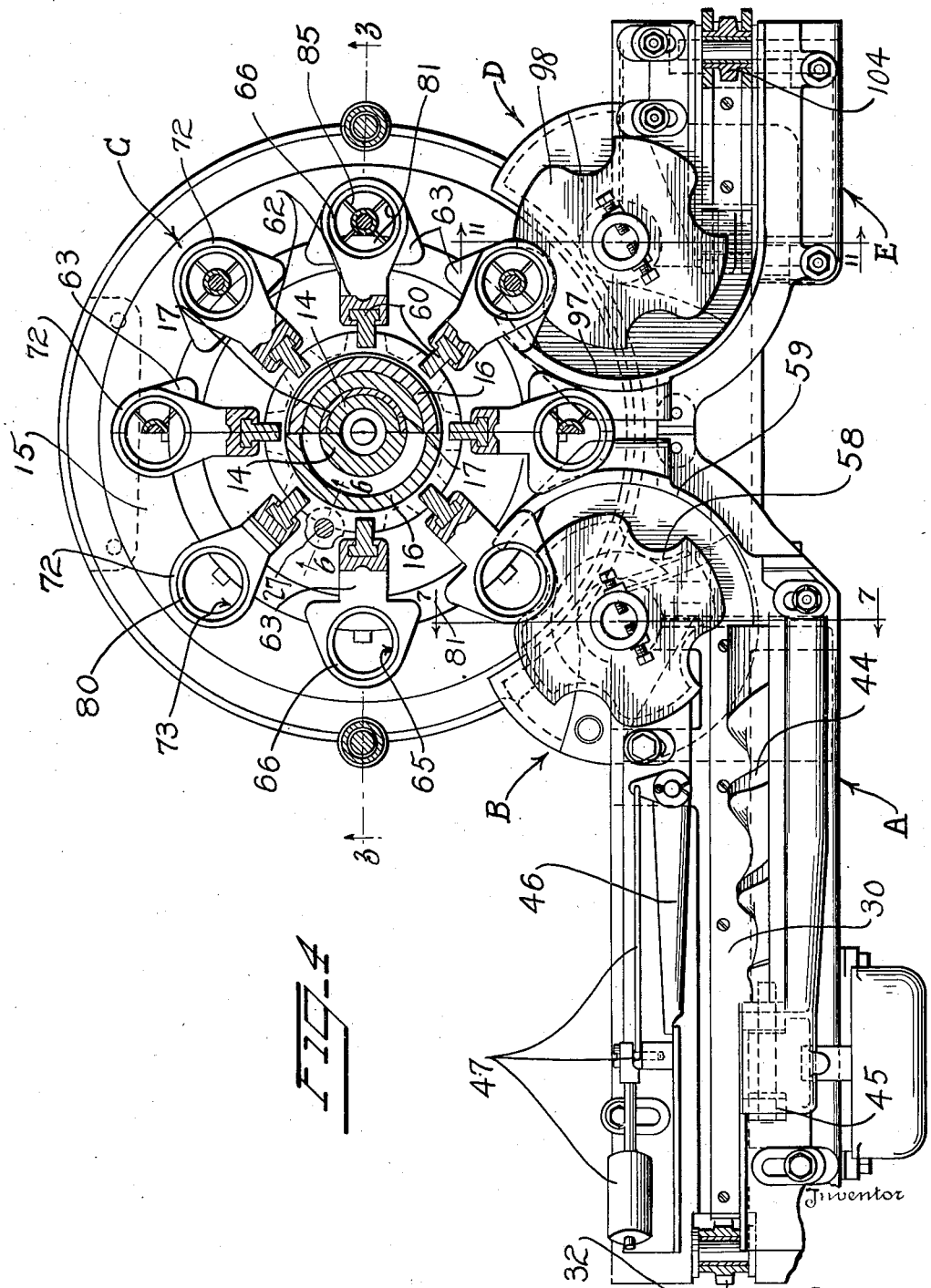

Nov. 11, 1941. P. E. PEARSON 2,262,697
CAN CLEANING MACHINE
Filed Jan. 29, 1940 6 Sheets-Sheet 5
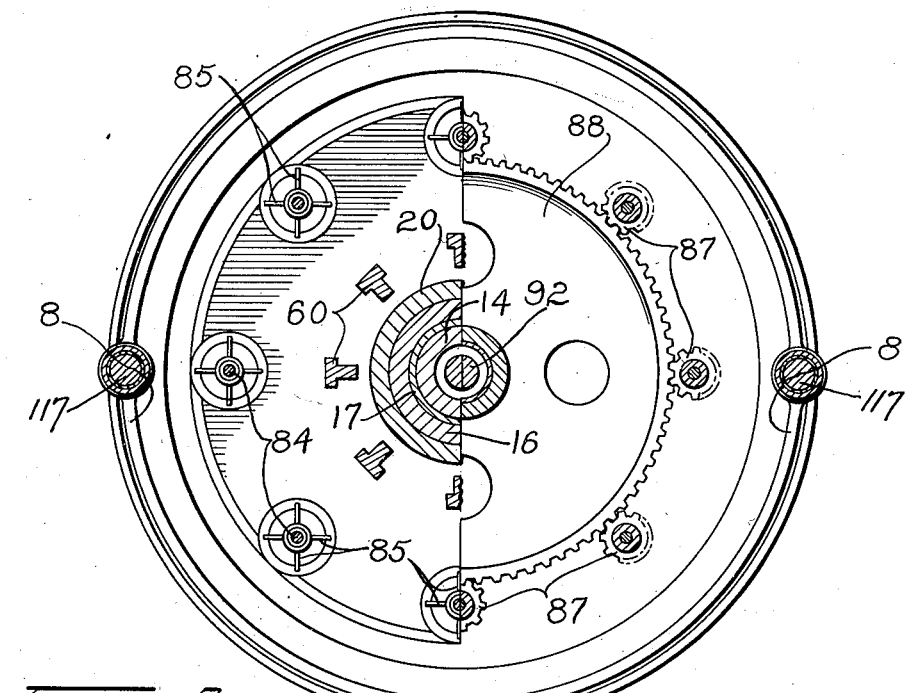
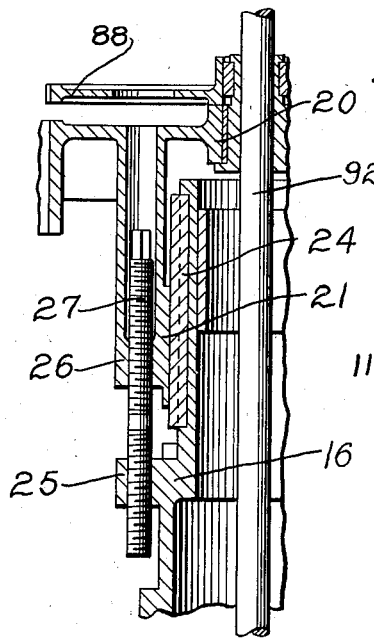
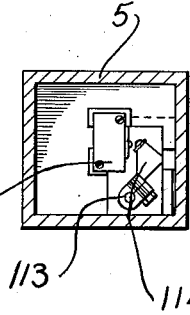
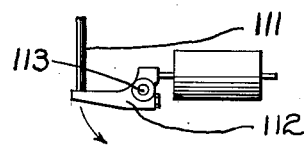
Inventor
Paul E. Pearson
By
Mason & Porter
Attorneys

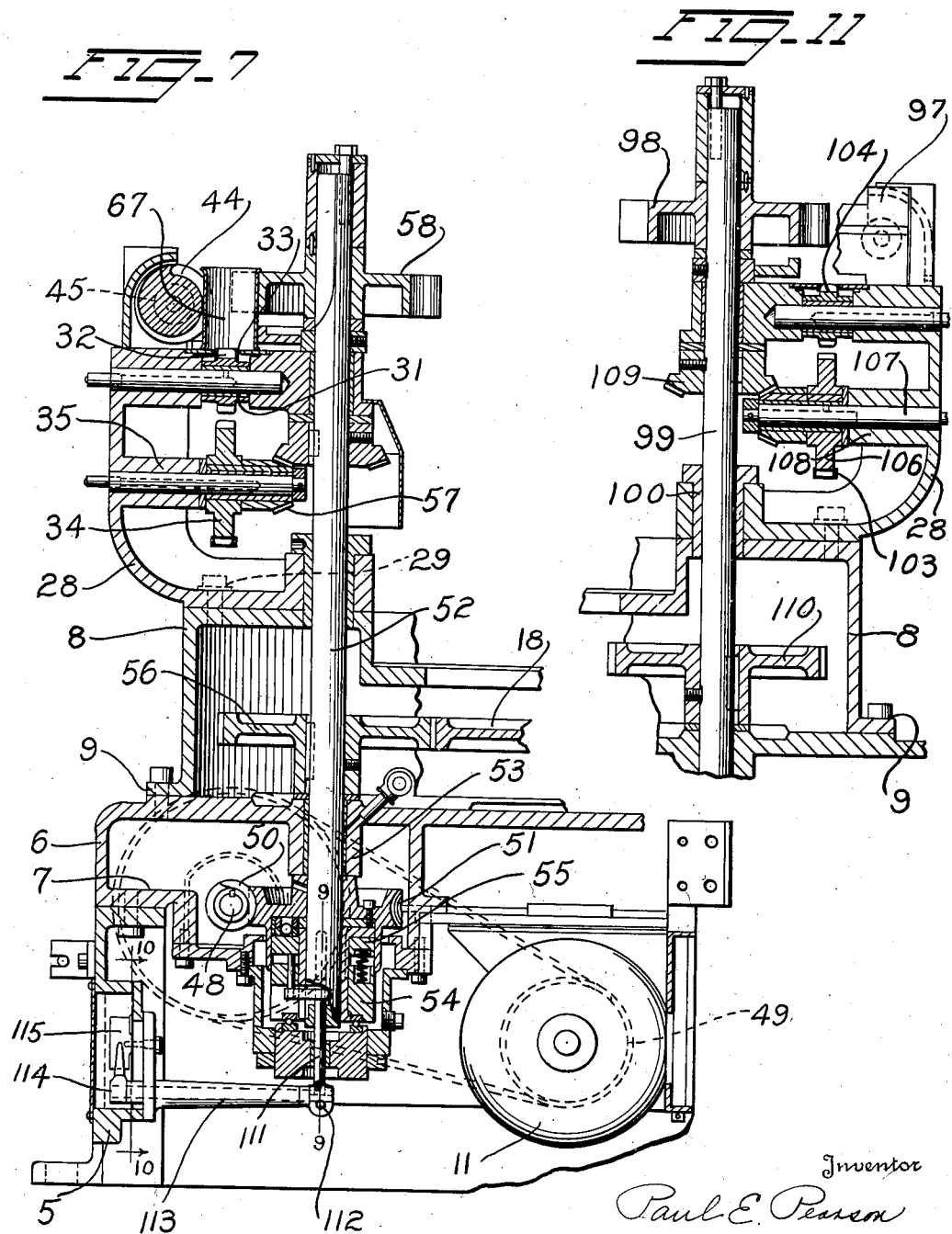

Patented Nov. 11, 1941

2,262,697

UNITED STATES PATENT OFFICE 2,262,697

CAN CLEANING MACHINE

Paul E. Pearson, Chicago, Ill., assignor to Continental Can Company, Inc., New York, N. Y., a corporation of New York Application January 29, 1940, Serial No. 316,197

17 Claims. (Cl. 15—101)

The invention relates generally to the art of manufacturing cans and seeks to provide a novel machine structure primarily designed for automatically cleaning solder bits from the interior surfaces of cans but which is equally effective in cleaning cans of all foreign matter such as rust, dirt, flux, grease, or the like, which might be present on the interior surfaces thereof.

In the making of can bodies, body blanks are customarily shaped cylindrically about a forming horn and have their meeting edges hooked together in the form of a longitudinal seam which is secured by a bumping pressure against said horn. Following the formation of this side seam, the can bodies are rapidly fed along in longitudinally spaced relation, and while being so fed the side seams are contacted by a solder roll which rotates beneath the can bodies about an axis disposed parallel the line of feed. Following the soldering of the can body seams a wiper roll rapidly rotating about a horizontal axis disposed transversely of the line of feed contacts the soldered side seams of the rapidly moving can bodies for the purpose of removing excess solder. As the trailing edge of each rapidly moving can body passes over the wiping roll, there is a tendency for this roll to throw off spatters of molten solder bits, and these bits of solder fly into the oncoming open end of the next succeeding can body and adhere to the internal surface thereof.

This spattering or splashing of solder is obviously objectionable because the solder pellets, very small in size, adhere only lightly to the interior surfaces of the can bodies and often become detached and fall into the contents contained in the finished cans. It is, therefore, the purpose of the present invention to provide a machine in which the solder bits objectionably adhered to the interior surfaces of cans, or any other foreign matter adhered to said surfaces, can be automatically removed therefrom so as to avoid all possibility of contamination of products filled into the finished cans.

In its more detailed nature the invention resides in the provision of a machine of the character stated in which is embodied a continuously rotating turret structure having means for gripping and holding the flanged ends of the can bodies, rapidly rotating cleaning elements axially aligned with the respective can holding means, means for bringing about relative longitudinal movement between the can holding means and the axially aligned cleaning elements to cause said elements to rapidly rotate within and engage all internal surfaces of the can bodies, means for feeding can bodies onto the turret structure, and means for feeding cleaned can bodies from said turret structure.

Another object of the invention is to provide novel means for adjusting the relation of the can holding means and the cleaning elements so as to adapt the machine for use in cleaning can bodies of different dimensions.

Another object of the invention is to provide a machine of the nature stated in which the can body feeding means and the can body cleaning turret are driven from separate motors, and in which there is embodied power transmitting connections including an overload release clutch and means actuated upon release of said clutch as a result of a jam in the machine for discontinuing operation of both motors.

With these and other objects in view which will more fully appear, the nature of the invention will be more clearly understood by following the description, the appended claims, and the several views illustrated in the accompanying drawings.

In the drawings:

Figure 2 is a horizontal section taken on the line 2—2 on Figure 1.

Figure 4 is a horizontal section taken on the line 4—4 on Figure 3.

Figure 5 is a horizontal section taken on the line 5—5 on Figure 3.

Figure 6 is a fragmentary vertical section taken on the line 6—6 on Figure 4.

Figure 7 is a fragmentary vertical section taken on the line 7—7 on Figure 4.

Figure 8 is a fragmentary vertical section taken across the can body feed-in means.

Figures 9 and 10 are fragmentary vertical sectional views illustrating the motor cutout switch actuating levers, the sections being taken on the lines 9—9 and 10—10 respectively on Figure 7.

Figure 1:
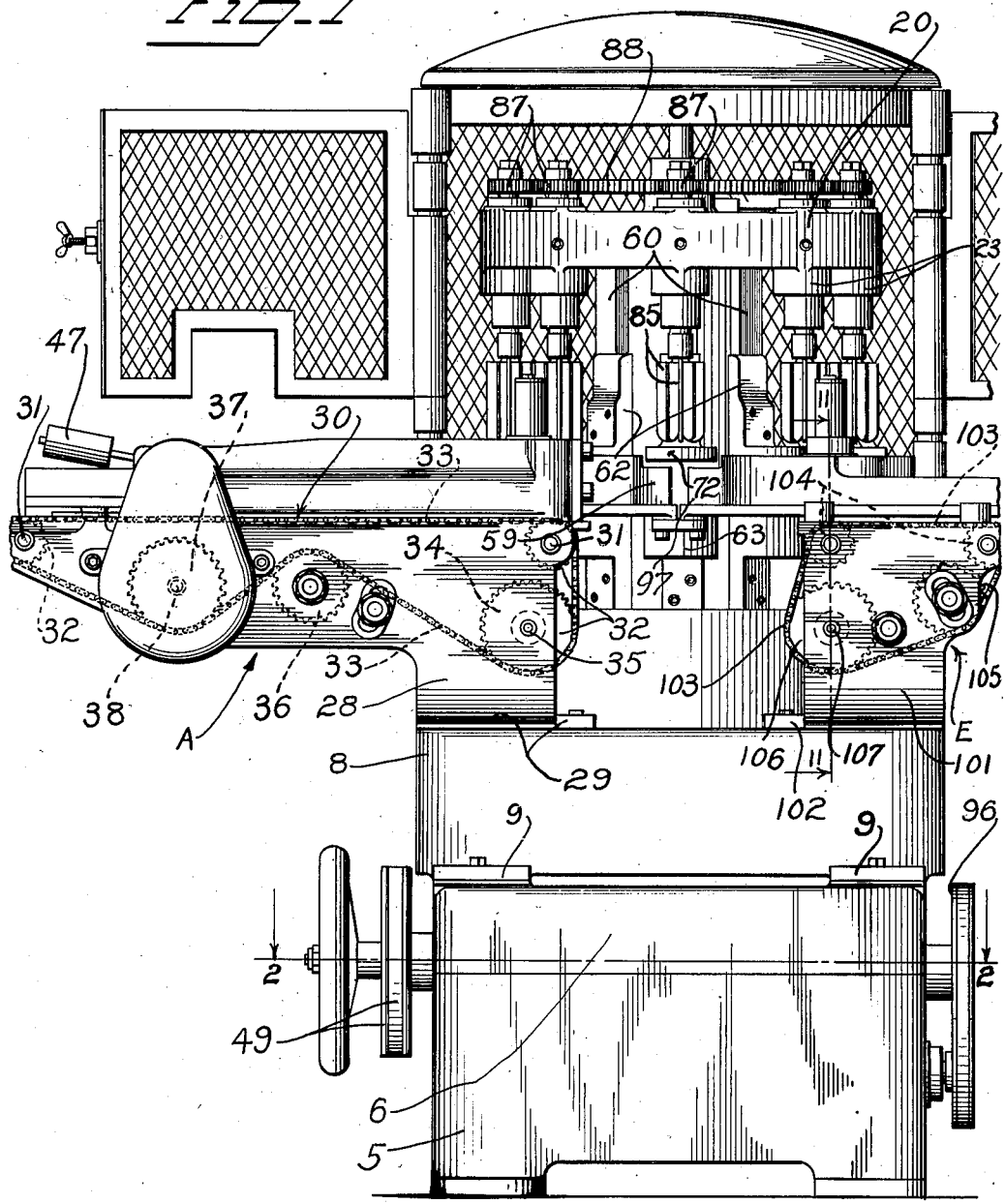
Figure 1 is a front elevation illustrating the invention.

Figure 11 is a fragmentary vertical section taken on the line 11—11 as applied on Figures 1 and 4.

Figure 12 is an enlarged detailed horizontal section taken through one of the rotary cleaning heads and a can body being cleaned thereby.

In the example of embodiment of the invention herein illustrated, there is included a can body feed-in means A from which the flanged and open-ended can bodies are transferred by a transfer device generally designated B onto the continuously rotating cleaning turret generally designated C, and from this turret the cleaned can bodies are transferred by a transfer device generally designated D onto a feed-off mechanism generally designated E.

The machine herein disclosed includes a base frame 5, an intermediate frame portion 6 secured as at 7 upon the base portion, and an upper frame shell 8 which is flange-secured as at 9 upon the intermediate frame portion 6.

Figure 3:
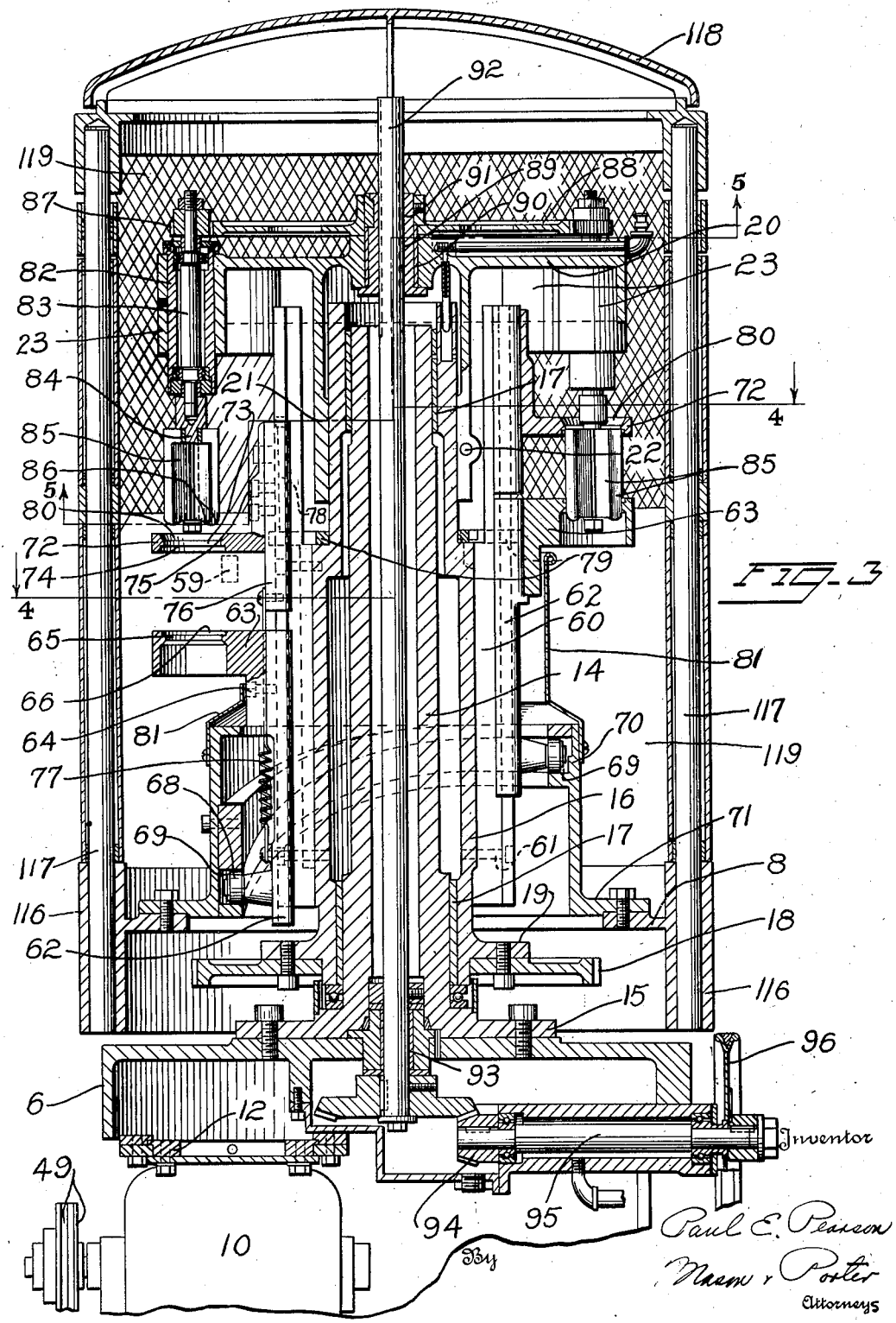
Figure 3 is a vertical cross section taken on the line 3—3 on Figure 4.

A feeding mechanism and can supporting or cleaning turret driving motor 10, and a cleaner spindle driving motor 11 are provided, and each motor is slidably mounted as at 12 and depends from the intermediate frame portion 6 in the manner best shown in Figures 2, 3 and 7 of the drawings. Each slidably mounted motor is bodily shiftable through the medium of a captive screw equipment 13.

A center standard or sleeve 14 is provided and is flange-secured as at 15 to project upwardly and centrally from the intermediate frame portion 6.

A can body supporting turret shell 16 is rotatably supported on suitable bearings 17 on the standard 14, and a large spur gear 18 is flange-secured as at 19 to said shell.

A cleaner spindle mounting turret 20 is provided and includes a depending mounting sleeve 21 which telescopically embraces the upper end of the turret shell 16 and is clamped thereon in various positions of adjustment by a suitable clamping means 22. The turret 20 is equipped with a plurality of spindle bearings or hubs 23 which depend in equidistantly spaced relation from the peripheral portion of said turret. The turret structure 20, 21 is spline-connected as at 24 with the upper end of the turret shell 16 so as to prevent relative rotation of these parts, and the upper portion of the shell 16 and the mounting sleeve 21 are respectively provided with lugs 25 and 26 having threaded bores therein for receiving an adjusting screw 27 through the medium of which the vertically spaced relation between the turret 20 and the turret shell 16 can be altered to adapt the machine for cleaning can bodies of different dimensions.

The feed-in mechanism generally designated A includes a frame 28 which is flange-secured as at 29 to a portion of the main framing of the machine, and this frame includes a feed table portion 30. The frame 28 also includes bearing equipments 31 at its respetcive ends for rotatably supporting shafts bearing small sprockets 32 over which the can body feeding chain 33 passes. The chain 33 also passes over a driver sprocket 34 secured upon a shaft having bearing as at 35 in the frame part 28, and over an adjustably mounted idler sprocket 36 and a driver sprocket 37 secured upon a shaft 38 having bearing as at 39 in said frame. The shaft 38 carries a gear 40 and this gear meshes with a gear 41 secured on the shaft 42 which is connected by a bevel gear coupling 43 with a timing screw 44 rotatably mounted in supporting bearings 45. The timing screw 44 is opposed by a yieldable guide wall 46 held in normal position by weight, link and lever connections generally designated 47.

The motor 11 drives a power shaft 48 through belt and pulley connections 49. The shaft 48 carries a worm gear 50 which meshes with and imparts rotation to a worm wheel 51 freely encircling a shaft 52 vertically disposed and rotatable in bearings 53 provided therefor in the frame parts 6, 8 and 28 hereinbefore referred to. The worm wheel 51 is connected in driving relation with the shaft 52 through the medium of an overload release clutch equipment generally designated 54 which is keyed to the shaft 52 and includes a longitudinally displaceable ring 55. A spur gear 56 secured upon the shaft 52 meshes with and imparts rotation to the turret gear 18. The shaft 52 also imparts rotation to the shaft which carries the sprocket 34 through the medium of a bevel gear coupling 57, and also to the peripherally pocketed transfer rotor 58 directly secured on the upper end of said shaft and constituting a part of the can body transferring mechanism hereinbefore generally designated A.

It will be obvious that the can bodies moving along on the feed-in chain 33 and between the yieldable side wall 46 and the timing screw 44 will be individually received in the peripheral pockets of the rotor 58 and transferred to the continuously rotating cleaner turret. While being transferred, the can bodies are supported by their upper outwardly extended flanges on the rotor 58 and are guided or confined in the pockets of said rotor by an arcuate guide wall 59.

T-shaped slide guide bars 60 are secured in vertical, equidistantly spaced relation about the turret shell 16 as at 61. A lower chuck slide 62 is slidable on the lower end of each of the bars 60, and each such slide carries a can supporting chuck 63 which is removably secured as at 64 at the upper end of said slide and includes an opening 65 therethrough and an annular recess or seat 66 for receiving the bottom flange of a can body designated 67.

A roller 68 is carried at the lower end of each of the slides 62 and rides in a lifting and lowering groove 69 in a cam shell 70 which is flange-secured as at 71 on the frame portion 8.

Each lower chuck member 63 is opposed by a somewhat similar upper chuck member 72 having an opening 73 therethrough and an annular recess or seat 74 for receiving the upper flange of a can body, and each of the upper chuck members is removably secured as at 75 to an upper slide 76 slidably mounted on the upper end of one of the T-bars 60. See Figures 3 and 4 of the drawings.

A spring means 77 constantly tends to move the upper and lower chuck members 63 and 72 of each chuck complement toward each other, and the downward movement of each upper chuck bearing slide is limited by a stop screw 78 engageable with stop means 79 mounted on the turret shell 16.

It will be observed by reference to Figure 3 of the drawings that each of the openings in the upper chuck member 72 is flared as at 80 to facilitate movement of the cleaning element therethrough, and a closure shell 81 projects upwardly from the cam shell 70 and protects the machine parts from introduction of bits of foreign matter cleaned from can bodies mounted on the rotating turret structure.

Each spindle turret bearing 23 supports a bearing sleeve 82 in which a spindle 83 is rotatably mounted in anti-friction bearings. At its lower end each spindle removably mounts a cleaning element or rotor 84 and each such rotor preferably includes a central core and a plurality of radially projected flexible ribs 85. See Figures 3 and 12 of the drawings. It is to be understood that these cleaning rotors may take the form of bristle brushes, or other suitable rotary cleaning elements may be employed. When the radially projected flexible ribs 85 herein specifically mentioned are employed, the lower ends thereof are rounded as at 86 to facilitate entry into the can bodies through the flared opening portions 80 of the upper chuck members 72.

A small spur pinion is secured to the upper end of each cleaner spindle 83, and all of these spur pinions mesh with and are rapidly rotated by a large spur gear 88 keyed to a sleeve 89. The sleeve 89 is rotatably mounted as at 90 on the spindle head 20 and is spline-connected as at 91 to a driver shaft 92 mounted within the standard sleeve 14 and having rotative bearing at its lower end as at 93 in the intermediate frame portion 6. Rotation is imparted to the shaft 92 through a bevel gear couple 94 with the shaft 95 which has rotative bearing in the frame portion 6 and is pulley and belt connected as at 96 with the motor 10 hereinbefore referred to.

Cleaned can bodies are stripped from the lower chuck members by an arcuate guide wall 97 and are picked up by their top flanges on the peripherally pocketed rotor 98 forming a part of the feed-away mechanism hereinbefore generally designated E. The rotor 98, which is constructed and operated in the same manner as is the rotor 58 hereinbefore described, is secured upon the upper end of a shaft 99 supported in suitable bearings 100 in the frame parts 6 and 8 and in the frame part 101 forming a part of the feed-off mechanism E. The frame part 101 is flange-secured as at 102 on the main machine frame.

The peripherally pocketed rotor 98 delivers the cleaned can bodies onto a feed-off chain 103 which passes over sprockets 104 on supporting shafts having suitable bearing in the frame part 101 and over an adjustably mounted idler sprocket 105 and a driver sprocket 106. The driver sprocket 106 is secured upon a shaft 107 which has bearing as at 108 on the frame part 101 and is connected by a bevel gear couple 109 with the shaft 99. The shaft 99 also carries a spur gear 110 which meshes with and is driven by the turret gear 18.

An actuator pin 111 is movable with the displaceable ring 55 of the overload release clutch equipment 54, and this pin engages the free end of a lever 112 which is pivotally supported as at 113 and has affixed thereto another lever arm 114 disposed in cooperative relation with a cutout switch 115. It is to be understood that the cutout switch is connected in the power circuit which serves both motors 10 and 11, and whenever a jam occurs in the machine which will cause a breaking of the drive relation between the worm wheel 51 and the shaft 52 and the imparting of longitudinal movement to the ring 55, the pin 111 will trip the levers 112 and 114 and actuate the control switch 115 to break the motor circuit and discontinue operation of both of the motors 10 and 11. See Figures 9 and 10.

The frame portion 8 also includes bearing portions 116 in which are mounted standards 117. The standards may be utilized to support a top portion 118 and a suitable casing shell 119 for wholly or partially enclosing the cleaning turret structure.

In operation, containers fed into the machine over the feed-in equipment A are deposited one by one by the transferring and supporting rotor 58 onto the seats 66 formed on the lower chuck members 63, it being understood that the control groove 69 is so shaped that each lower chuck member will be moved upwardly to receive a can body as the particular chuck member reaches aligned relation with one of the peripheral pockets of the transfer rotor 58. It should be understood also that at the time at which can bodies are received on the lower chuck members 63 the respective complement of upper and lower chuck members 63, 72 are held separated, against the urge of the spring equipments 77, by the cam groove 69 and the stop equipments 78, 79.

As a given chuck complement on the continuously rotating cleaner turret 16, 20, 21 moves away from the can body receiving station, the respective lower chuck member 63 is moved upwardly to cause the upper flange of the can body carried thereby to seat in the annular recess 74 of the respective upper chuck member 72 and be clamped thereagainst by the respective spring equipments 77. It will be obvious that during this chucking or clamping of each can body the respective stop screw 78 will be lifted out of engagement with the stop equipments 79.

The cam groove 69 now continues upward movement of the complement of chuck members 63, 72 and the open ended can body clamped therebetween to cause the can body to pass up over the respective cleaning element 84, 85, and this upward movement of the can body is sufficient to cause the cleaning element to pass through and engage all of the interior wall portions of the can body. The individual cleaning spindles may be operated at from 1000 to 3000 R. P. M. A speed of 2100 R. P. M. is preferred, and at this speed of rotation of the spindles, and a suitably related speed of operation of the remaining parts of the machine, 250 cans can be cleaned per minute. Variable pitch power transmitting sheaves (not shown) may be associated with the motors, if desired, and by the use of such means the speed of operation of the moving parts of the machine can be varied so as to vary the capacity of the machine between 240 and 360 cans per minute.

Following the cleaning of individual can bodies in the manner just above described, the cam groove 69 serves to lower the individual chuck members of the respective chuck complement 63, 72 in unison until the downward movement of each upper chuck member 72 is stopped by engagement of the stop devices 78, 79. Continued downward movement of the lower chuck members 73 will bring about separation of the chuck members 63 and 72 of each complement, thereby freeing the cleaned can body. It should be understood that the downwardly moving lower chuck members come into alignment with the respective pockets of the transfer rotor 98 just as the guiding wall 97 strips the respective can bodies from the supporting chuck members and confines them in flange supported relation on the rotor 98. The rotor 98 transfers the cleaned can bodies onto the delivery chain 103 which delivers them from the machine and onto a take-off conveyor system of any suitable form.

It is of course to be understood that the details of structure and arrangement of parts may be variously changed and modified without departing from the spirit and scope of my invention.

I claim:

1. In a machine for interiorly cleaning can bodies open at both ends, a rotary turret, can body holding means movable with the turret, can body cleaning means movable with the turret, means for bringing about relative movement between the holding means and the cleaning means to cause the cleaning means to move into and wholly through and then out of can bodies held by said holding means for engaging and cleaning foreign matter from the interior surfaces of said can bodies throughout the length thereof, means to feed cans to the turret for being cleaned thereon, and means for feeding cleaned cans from said turret.

2. In a can cleaning machine, a rotary turret for holding the cans while they are cleaned, driven means for engaging the cans and cleaning them while they are held on the turret, a driving motor and a set of power transmitting connections for driving the cleaning means, and another driving motor and a set of power transmitting connections for imparting movement to the turret, one said set of connections including an overload release clutch, and means actuated by release of said clutch for discontinuing operation of both motors.

3. In a machine for interiorly cleaning can bodies open at both ends, a can body cleaning element, a can body holding unit comprising upper and lower apertured chuck members engageable at the open ends of a can body and means for moving said members against said ends, and means for bringing about relative movement between said element and said unit to cause the element to engage in and clean a can body interiorly and then disengage said can body.

4. In a machine for interiorly cleaning can bodies open at both ends, a rotary turret, a plurality of can body cleaning elements, a plurality of can body holding units, said elements and units being aligned one with another and movable with the turret, each said unit comprising upper and lower apertured chuck members engageable at the open ends of a can body and means for moving said members against said ends, means for bringing about relative movement between said elements and said units to cause the elements to engage in and clean can bodies interiorly and then disengage said can bodies, means for at times separating the upper and lower holding unit chuck members, means at one position for feeding uncleaned can bodies between upper and lower holding unit chuck members while they are separated, and means at another position for removing cleaned can bodies from between upper and lower holding unit chuck members while they are separated.

5. In a machine for interiorly cleaning can bodies open at both ends, a can body cleaning element, a can body holding unit comprising upper and lower apertured chuck members engageable at the open ends of a can body and means for moving said members against said ends, and means for bringing about relative movement between said element and said unit to cause the element to engage in and clean a can body interiorly and then disengage said can body, said means for moving the upper and lower chuck members against the can body ends including spring means for yieldably clamping said upper and lower chuck members against the can body ends while they are being cleaned.

6. In a machine for interiorly cleaning can bodies open at both ends, a rotary turret, a plurality of can body cleaning elements, a plurality of can body holding units, said elements and units being aligned one with another and movable with the turret, each said unit comprising upper and lower apertured chuck members engageable at the open ends of a can body and means for moving said members against said ends, means for bringing about relative movement between said elements and said units to cause the elements to engage in and clean can bodies interiorly and then disengage said can bodies, means for at times separating the upper and lower holding unit chuck members, means at one position for feeding uncleaned can bodies between upper and lower holding unit chuck members while they are separated, means at another position for removing cleaned can bodies from between upper and lower holding unit chuck members while they are separated, and means for adjusting the spaced relation of said cleaning elements and said holding units so that the machine can be adapted for cleaning can bodies of various sizes.

7. In a machine for interiorly cleaning can bodies open at both ends, a rotary turret, a plurality of can body cleaning elements, a plurality of can body holding units, said elements and units being aligned one with another and movable with the turret, each said unit comprising upper and lower apertured chuck members engageable at the open ends of a can body and means for moving said members against said ends, means for bringing about relative movement between said elements and said units to cause the elements to engage in and clean can bodies interiorly and then disengage said can bodies, means for at times separating the upper and lower holding unit chuck members, means at one position for feeding uncleaned can bodies between upper and lower holding unit chuck members while they are separated, and means at another position for removing cleaned can bodies from between upper and lower holding unit chuck members while they are separated, each said chuck member having a can flange receiving recess therein effective to secure cans against movement sidewise with relation to the axes thereof.

8. In a machine for interiorly cleaning can bodies open at both ends, a rotary turret, a plurality of can body cleaning elements, a plurality of can body holding units, said elements and units being aligned one with another and movable with the turret, each said unit comprising upper and lower apertured chuck members engageable at the open ends of a can body and means for moving said members against said ends, means for bringing about relative movement between said elements and said units to cause the elements to engage in and clean can bodies interiorly and then disengage said can bodies, means for at times separating the upper and lower holding unit chuck members, means at one position for feeding uncleaned can bodies between upper and lower holding unit chuck members while they are separated, means at another position for removing cleaned can bodies from between upper and lower holding unit chuck members while they are separated, said turret comprising upper and lower telescopically connected sections, said cleaning elements being mounted on one section and said holding units being mounted on the other section, and means for adjusting the telescoped relation of said sections for adapting the machine for cleaning cans of various sizes.

9. In a machine for interiorly cleaning can bodies open at both ends, a rotary turret, a plurality of can body cleaning elements, a plurality of can body holding units, said elements and units being aligned one with another and movable with the turret, each said unit comprising upper and lower apertured chuck members engageable at the open ends of a can body and means for moving said members against said ends, said turret including a plurality of slide guides spaced equidistantly thereabout, the upper and lower chuck members of each holding unit being slide guided on one said slide guide, means for bringing about relative movement between said elements and said units to cause the elements to engage in and clean can bodies interiorly and then disengage said can bodies, means for at times separating the upper and lower holding unit chuck members, means at one position for feeding uncleaned can bodies between upper and lower holding unit chuck members while they are separated, and means at another position for removing cleaned can bodies from between upper and lower holding unit chuck members while they are separated.

10. In a machine for interiorly cleaning can bodies open at both ends, a rotary turret, a plurality of individual can holding means for holding open-ended can bodies without obstruction at or adjacent either end thereof, a rotary cleaning element engageable with the interior wall surface of a can held by each holding means, means for feeding cans to the holding means, means to move said holding means toward and from said cleaning elements to cause said elements to engage in and move wholly through can bodies held by said holding means, and means for feeding cleaned cans from said holding means.

11. In a can cleaning machine, a rotary turret, a plurality of individual can holding means, a rotary cleaning element engageable with the interior wall surface of a can held by each holding means, means for feeding cans to the holding means, each said holding means including an apertured chuck member for engaging one end of a can and a second apertured chuck member for engaging the other end of said can, means for moving each said second chuck member toward and from the associated cleaning element to cause a can thereon to engage said first mentioned chuck member and be clamped thereagainst and then move over said cleaning element to cause it to rotate in engagement with the interior wall surface of the can and extend slightly therebeyond and then to move away from said cleaning element and again ultimately away from said first mentioned chuck member to free the can, and means for feeding cleaned cans from said holding means.

12. A machine as defined in claim 11 wherein is provided means for yieldably urging each associated pair of chuck members toward each other, and positive stop means limiting movement of each said second chuck member in a direction away from the associated cleaning element.

13. In a can cleaning machine, a turret continuously rotatable about a vertical axis, a plurality of guide members disposed vertically and in equidistantly spaced relation about said turret, an upper and a lower slide member vertically slidable on each guide member, stop means limiting downward movement of each upper slide member, an apertured chuck member projecting from each slide the apertures of each upper and lower pair of said chuck members being axially aligned, a rotary cleaning element disposed in axial alignment above the apertures of each upper and lower complement of chuck members, means for feeding cans onto and for removing them from the continuously moving lower chuck members, and means for lifting and lowering said lower chuck members to cause cans thereon to engage and be clamped against the upper chuck members and then move with both chuck members to encircle and be cleaned by the cleaning elements and then again lower said cans and effect a can freeing separation of the upper and lower chuck members.

14. A machine as defined in claim 13 wherein there is included spring means for yieldably urging the upper and lower chuck members of each associated pair toward each other whereby cans will be yieldably clamped by the engaging chuck members during the cleaning thereof.

15. A machine as defined in claim 13 wherein each chuck member includes an annular can end flange seating recess surrounding the aperture therein, and each upper chuck member aperture is upwardly flared to facilitate entrance of the associated cleaning element therethrough.

16. A machine as defined in claim 13 wherein each cleaning element has a spur pinion attached thereto, and there is included a spur gear rapidly rotatable relative to said turret and meshing with all said spur pinions.

17. A machine as defined in claim 13 wherein each cleaning element has a spur pinion attached thereto, and there is included a spur gear rapidly rotatable relative to said turret and meshing with all said spur pinions, and wherein said turret includes upper and lower telescopically connected sections, and means for adjusting the telescoped relation of said sections for altering the spaced relation of the cleaning elements above the lower chuck members.

PAUL E. PEARSON.